(12) United States Patent
Komaki

(10) Patent No.: US 7,474,766 B2
(45) Date of Patent: Jan. 6, 2009

(54) MOTION IMAGE PROCESSOR, MOTION IMAGE PROCESSING METHOD AND RECORDING MEDIUM

(75) Inventor: Yoshio Komaki, Kobe (JP)

(73) Assignee: Minolta Co., Ltd., Osaka-Shi, Osaka (JP)

(*) Notice: Subject to any disclaimer, the term of this patent is extended or adjusted under 35 U.S.C. 154(b) by 736 days.

(21) Appl. No.: 09/939,592

(22) Filed: Aug. 28, 2001

(65) Prior Publication Data

US 2002/0048389 A1  Apr. 25, 2002

(30) Foreign Application Priority Data

Sep. 1, 2000 (JP) .................. 2000-265119

(51) Int. Cl.
*G06K 9/00* (2006.01)

(52) U.S. Cl. .................. 382/107; 382/236

(58) Field of Classification Search .......... 382/107, 382/167, 274, 275, 263, 264, 255, 162, 236, 382/238, 239, 232, 233, 103; 73/488; 348/154, 348/155, 208.4; 356/27; 358/518
See application file for complete search history.

(56) References Cited

U.S. PATENT DOCUMENTS

| 5,537,528 | A | * | 7/1996 | Takahashi et al. | 715/512 |
|---|---|---|---|---|---|
| 5,614,945 | A | * | 3/1997 | Sekine et al. | 348/207.99 |
| 5,721,427 | A | * | 2/1998 | White et al. | 250/252.1 |
| 5,784,526 | A | * | 7/1998 | Shimoda et al. | 386/109 |
| 5,815,217 | A | * | 9/1998 | Kumazawa et al. | 348/700 |
| 6,037,986 | A | * | 3/2000 | Zhang et al. | 375/240.12 |
| 6,049,354 | A | * | 4/2000 | Sekine et al. | 348/208.6 |
| 6,330,344 | B1 | * | 12/2001 | Kondo et al. | 382/107 |
| 6,353,683 | B1 | * | 3/2002 | Horiike | 382/238 |
| 6,496,598 | B1 | * | 12/2002 | Harman | 382/154 |
| 6,694,051 | B1 | * | 2/2004 | Yamazoe et al. | 382/167 |

(Continued)

FOREIGN PATENT DOCUMENTS

JP  07-038842  2/1995

(Continued)

OTHER PUBLICATIONS

Office Action issued in corresponding Japanese Patent Application No. 2000-265119, dated Apr. 1, 2008 and its English translation.

*Primary Examiner*—Duy M Dang
(74) *Attorney, Agent, or Firm*—Buchanan Ingersoll & Rooney PC

(57) ABSTRACT

In an encoding unit 100 for encoding a motion image are provided a corrector 121 scene determiner 122, correction data generator 123, and scene change detector 124. The scene change detector 124 detects a scene change in a motion image based on a differential image during encoding, and the detection result is input to the scene determiner 122. The scene determiner 122 determines details of the scene of an image after a scene change using a predicted image from the movement compensator 116, and the correction data generator 123 determines the correction method based on the result of the scene determination. The corrector 121 executes corrections by the set correction method until a next scene change is detected. In this way the correction method is updated only when a scene change is detected, thereby executing suitable correction and reducing the quantity of calculation necessary for correction.

19 Claims, 12 Drawing Sheets

U.S. PATENT DOCUMENTS

| | | | |
|---|---|---|---|
| 2001/0017978 A1* | 8/2001 | Nagasawa | 386/111 |
| 2002/0191841 A1* | 12/2002 | Harman | 382/154 |
| 2003/0030729 A1* | 2/2003 | Prentice et al. | 348/220.1 |
| 2003/0133034 A1* | 7/2003 | Takahashi | 348/345 |

FOREIGN PATENT DOCUMENTS

| | | |
|---|---|---|
| JP | 7-115584 | 5/1995 |
| JP | 7-162850 | 6/1995 |
| JP | 07-212620 | 8/1995 |
| JP | 8-102938 | 4/1996 |
| JP | 9-37277 | 2/1997 |
| JP | 10-66084 | 3/1998 |
| JP | 11-298861 | 10/1999 |
| JP | 2000-057335 | 2/2000 |

* cited by examiner

FIG. 1
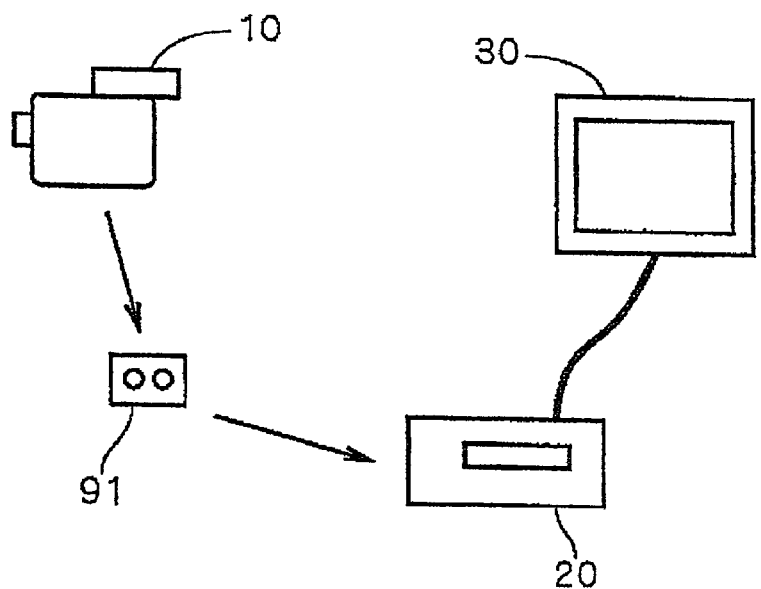
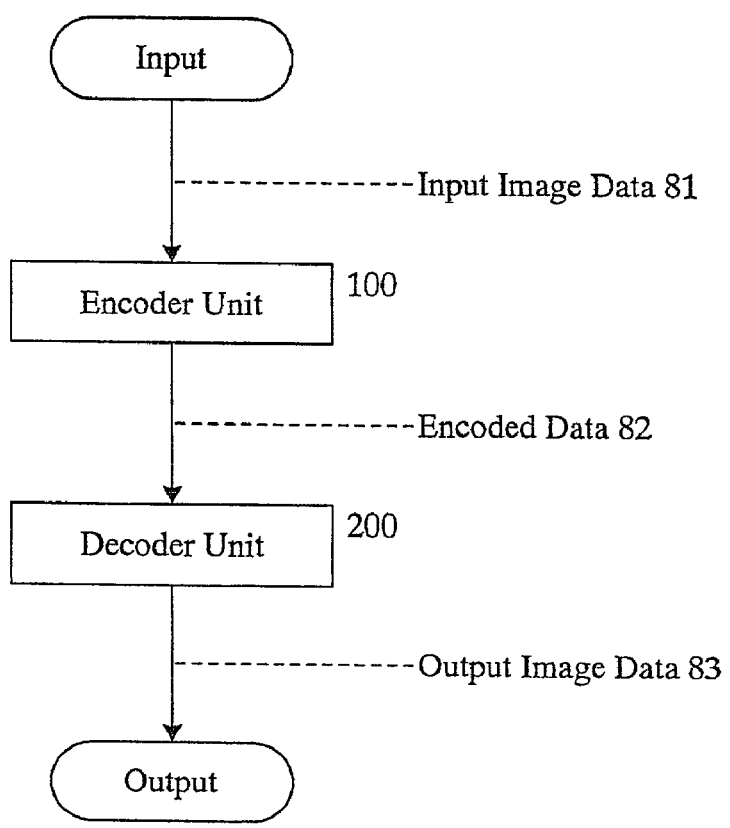

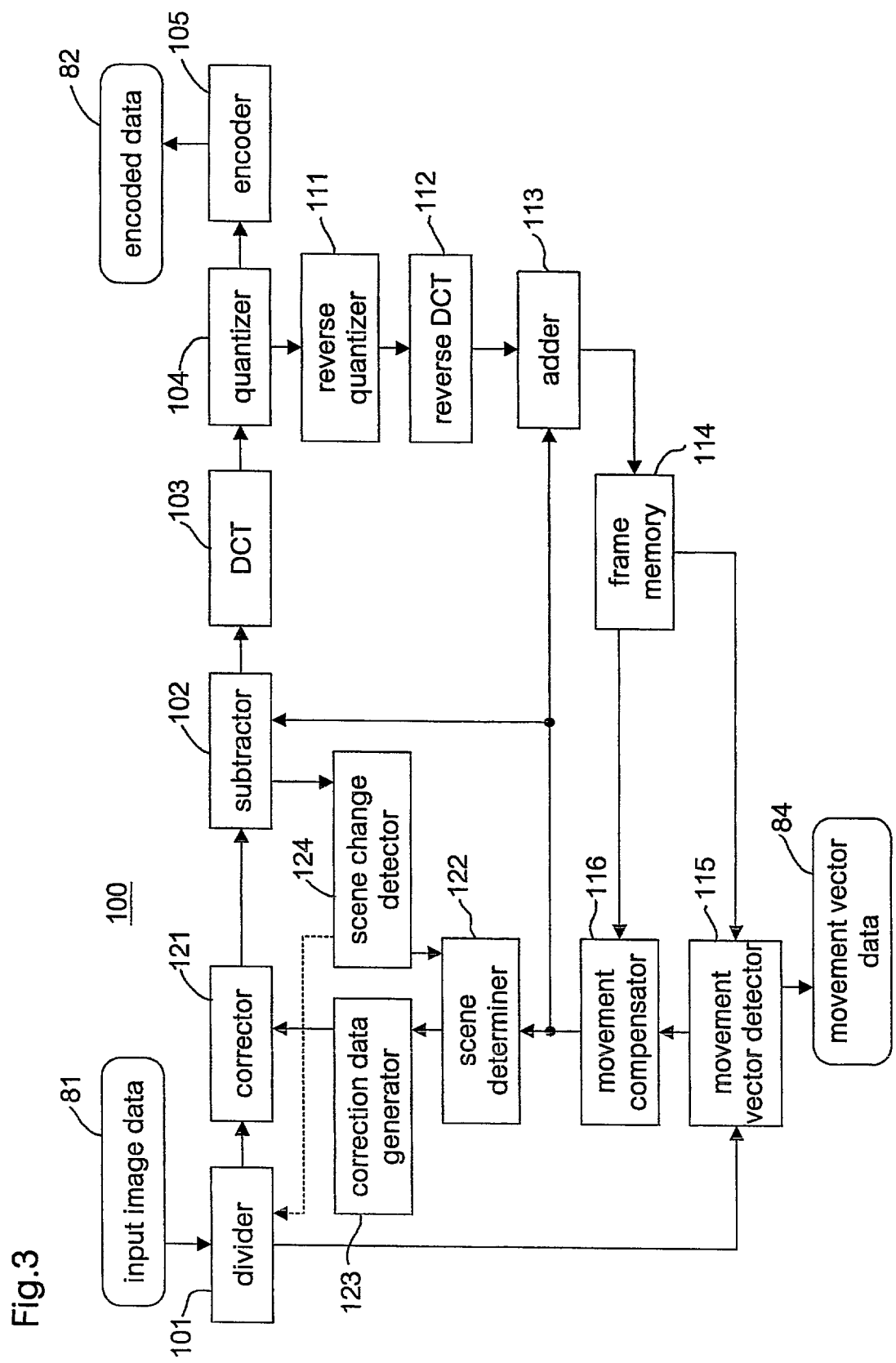

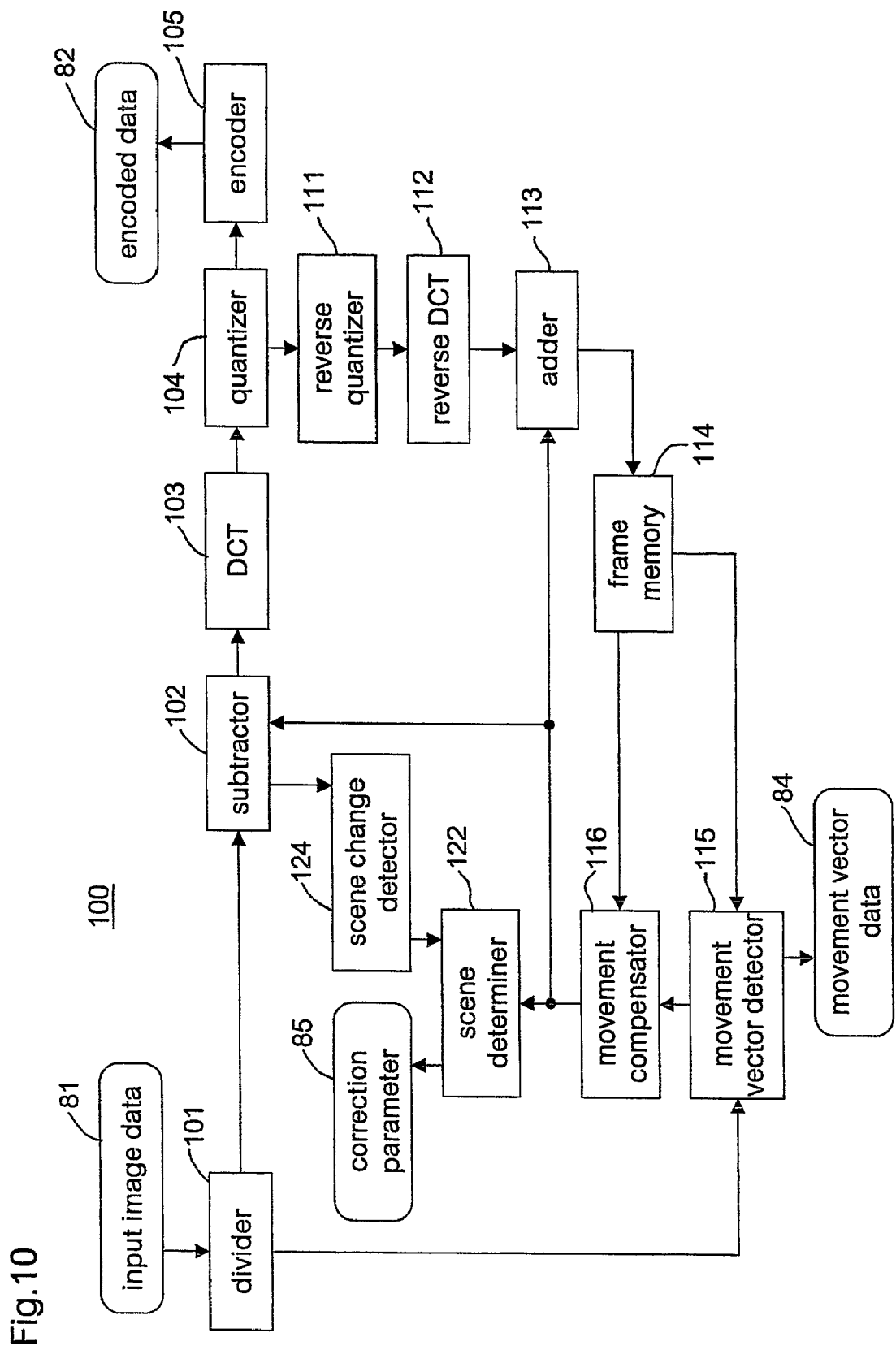

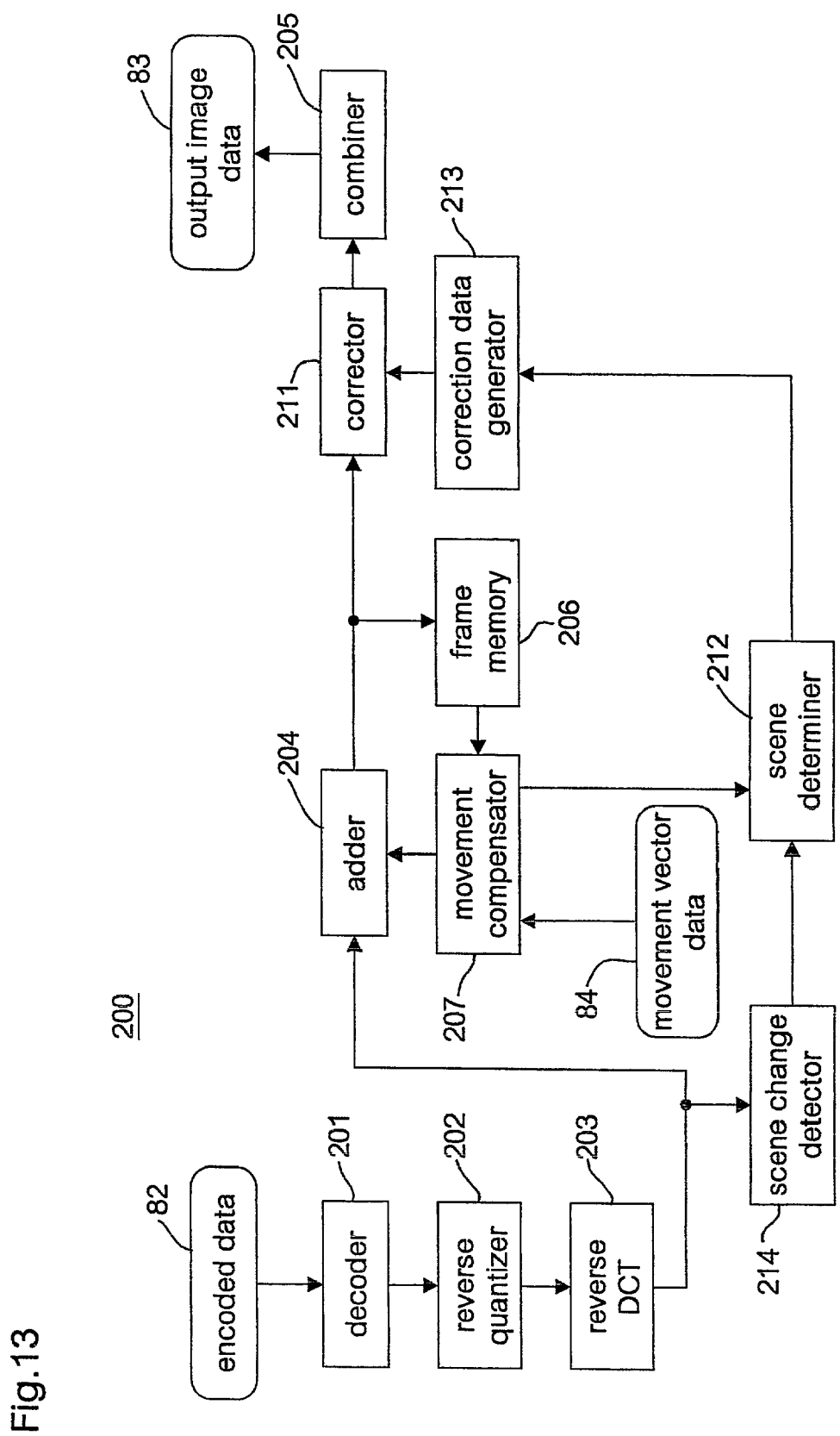

MOTION IMAGE PROCESSOR, MOTION IMAGE PROCESSING METHOD AND RECORDING MEDIUM

This application is based on application No. 2000-265119 filed in Japan, the content of which is hereby incorporated by reference.

BACKGROUND OF THE INVENTION

1. Field of the Invention

The present invention relates to art for correcting types of image characteristics such as tone, hue, chroma and the like of a motion image captured as digital data.

2. Description of the Related Art

Art heretofore has been proposed for correcting the tone and the like of a motion image in real time. For example, Japanese Laid-Open Patent No. H7-212620 discloses a motion image processor which performs simple tone correction in real time. However, the correction of a motion image by the device of this disclosure is limited, and correction suitable for the characteristics of each frame of the image cannot be accomplished.

On the other hand, Japanese Laid-Open Patent No. 2000-57335 discloses art for correcting a still image by determining the feature quantity of tone, hue, chroma and the like of an image, and performing high-level correction based on the feature quantities.

A great deal of calculations are necessary for correction when the image of each frame of a motion image is handled as a still image to achieve high-level correction of the still image which is applied to correct the motion image. For example, to process a motion image in real time, for example, 33 ms or less is required to process one frame in a motion image of 30 fps (30 frames per second). Accordingly, development of expensive processors are required to apply the correction method used for still images to real time correction of motion images.

For this reason, when performing high-level correction of a motion image, processing is executed in real time after the motion image has once been stored on a recording medium such as a hard disk or the like. In this case, a long time is also required for processing due to the quantity of calculations required to correct the entire motion image.

SUMMARY OF THE INVENTION

In view of these problems, an object of the present invention is to rapidly correct a motion image by reducing the amount of calculation required to correct the motion image.

According to one aspect of the present invention, a motion image processor comprises a acquiring portion for acquiring scene change information indicating a scene change in a motion image; and a determining portion for determining, when the scene change information is acquired, a correction process for the motion image until the next scene change information is acquired.

According to another aspect of the present invention, a motion image processor comprises a acquiring portion for acquiring scene change information indicating a scene change in a motion image; a determining portion for determining a correction process for the motion image until next scene change information is acquired; and a corrector for correcting the motion image based on the correction process until the next scene change information is acquired.

According to another aspect of the present invention, a motion image processing method comprises following steps of: acquiring scene change information indicating a scene change in a motion image; acquiring a process for correcting a motion image until the next scene change information is acquired; and correcting the motion image in accordance with the correction process until the next scene change information is acquired.

According to a further aspect of the present invention a computer-readable recording medium for storing a computer program executed by a computer for correcting a motion image, the computer program comprises following steps of: acquiring a scene change information indicating a scene change in the motion image; acquiring a process for correcting the motion image until a next scene change information is acquired; and correcting the motion image in accordance with the correction process until a next scene change information is acquired.

According to a still further aspect of the present invention, a motion image reproducer comprises a data reader for reading motion image data from a recording medium storing motion image data; a decoder for decoding the read data of motion image data; a detector for detecting scene change information indicating a scene change in the motion image from the decoded motion image; a determiner for determining a motion image correction process applied to a current scene when the scene change information is detected; an image corrector for correcting images in the current scene of the motion image in accordance with the determined image correction process; and an output interface for outputting motion image corrected.

According to a still further aspect of the present invention, an image sensing apparatus comprises an image sensing unit for acquiring a motion image; a detector for detecting scene change information indicating a scene change in the motion image acquired by the image sensing unit; a determiner for determining a motion image correction process applied to the current scene when the scene change information is detected; an image corrector for correcting images in the current scene of the motion image in accordance with the determined image correction process; and a recording device for recording the motion image corrected on a recording medium.

BRIEF DESCRIPTION OF THE PREFERRED EMBODIMENTS

These and other objects and features of this invention will become clear from the following description, taken in conjunction with the preferred embodiments with reference to the accompanied drawings in which:

FIG. 1 shows the structure of an image processing system;

FIG. 2 is a block diagram of the essential structure relating to the processing of a motion image;

FIG. 3 is a block diagram showing the structure of a encoding unit;

FIG. 10 is a block diagram showing the structure of an encoding unit;

FIG. 13 is a block diagram showing the structure of a decoding unit;

DETAILED DESCRIPTION OF THE PREFERRED EMBODIMENTS

1. First Embodiment

Figure 4:
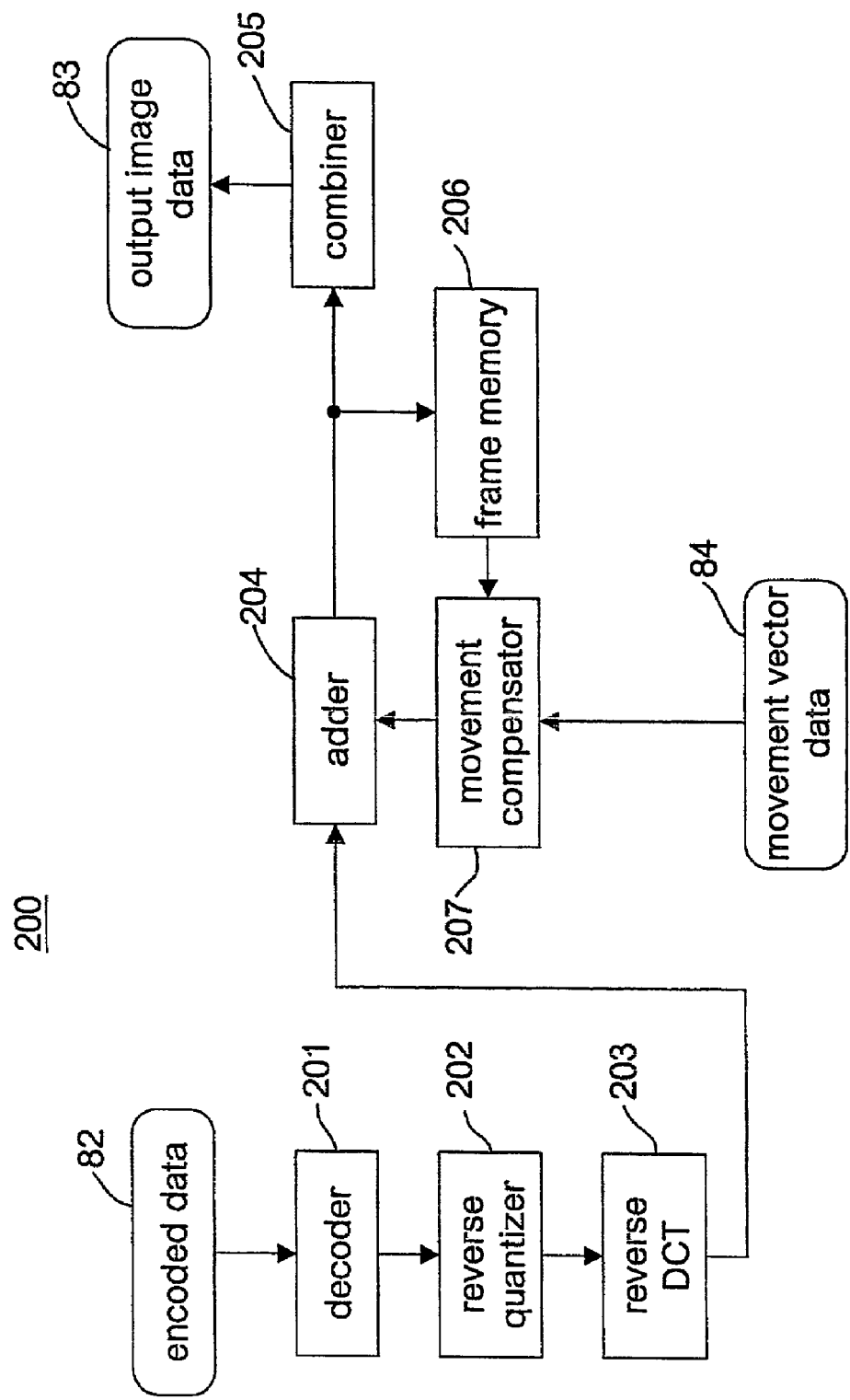
FIG. 4 is a block diagram showing the structure of a decoding unit.

FIG. 1 shows the structure of an image processing system 1 for acquiring, correcting, and regenerating a motion image. The image processing system 1 is provided with a video camera 10 for acquiring a motion image as digital data, reproducer 20 for transferring a motion image acquired by the video camera 10 through a recording medium such as magnetic tape, harddisk, CD, DVD or the like and regenerating the motion image, and a display 30 for displaying a regenerated motion image.

FIG. 2 is a block diagram showing the essential structure relating to the processing of a motion image in the image processing system 1. The image processing system 1 has an encoding unit 100 and a decoding unit 200, and a motion image acquired by the video camera 10 is input to the encoding unit 100 as input image data 81. The input image data 81 are encoded (i.e., subjected to a compression process) in the encoding unit 100, and output as encoded data 82. The encoded data 82 are input to the decoding unit 200 during regeneration, decoded (i.e., subjected to expansion processing), and output as output image data 83.

The encoding unit 100 and the decoding unit 200 also may be provided on only either the video camera 10 or reproducer 20 as described later, but in the following description, the encoding unit 100 is provided on the video camera 10, and the decoding unit 200 is provided on the reproducer 20.

FIG. 3 is a block diagram showing the structure of the encoding unit 100 which corrects and encodes the motion image in real time. Each structure of the encoding unit 100 is described below.

A divider 101 divides the image of each frame of the motion image input as input image data 81 into a plurality of area images (referred to hereinafter as "blocks"). For example, a raster scan image is converted to a block scan image in units of 8×8 pixel blocks.

Blocks generated in the divider 101 are sequentially input to a corrector 121, corrected, and input to the subtractor 102.

The subtractor 102 determines a differential image (hereinafter referred to as "differential block") of the corrected block from the corrector 121 and the block of the predicted image (hereinafter referred to as "predicted block") from an movement compensator 116 described later.

The differential block output from the subtractor 102 is input to the DCT 103. The DCT 103 executes a discrete cosine transform process on the differential block, and converts the signal of the time domain to a DCT coefficient of the frequency domain.

A quantizer 104 quantizes the DCT coefficient from the DCT 103, and an encoder 105 subjects the quantized DCT coefficient to variable length encoding, which are sequentially output as encoded data 82.

The DCT coefficient from the quantizer 104 is also input to the reverse quantizer 111; the reverse quantizer 111 restores the original DCT coefficient. An reverse DCT 112 generates a differential block from the DCT coefficient.

Predicted blocks from the restored differential block and movement compensator 116 are input to an adder 113, and these blocks are added by the adder 113. In this way the correction by the corrector 121 generates a reflected image block (i.e., decoded data). Thereafter, the generated image block is stored in a frame memory 114.

The frame memory 114 functions as a one-frame delay unit, and the corrected image blocks of the current frame are sequentially stored, and the corrected blocks of the previous image are sequentially output.

The blocks of the current image from the divider 101 and the blocks of the corrected image of the previous frame are input to an movement vector detector 115. The movement vector detector 115 detects a movement vector 84 indicating the movement of an object from these blocks. Although omitted from FIG. 2, the movement vector 84 (data) is transferred to the decoding unit 200 through the recording medium 91 together with the encoded data.

Movement compensator 116 predicts the blocks of the image of the current frame using the movement vector 84 from the movement vector detector 115, and the blocks of the corrected image of the previous frame from the frame memory 114. In this way predicted blocks are generated in the movement compensator 116. Then, the predicted blocks are input to the subtractor 102, adder 113, and scene determiner 122.

The structure described above is substantially similar to the structure in normal motion image compression. The compensator 121, scene determiner 122, correction data generator 123, and scene change detector 124 in the structure relating to motion image correction in the encoding unit 100 are described below.

The corrector 121 corrects the blocks input from the divider 101 in accordance with a previously determined correction method. The correction content may be various, but in the present embodiment, correction is described in terms of contrast and brightness (i.e., pixel gradient).

The scene determiner 122 generates scene information representing the characteristics of the photographed image based on the predicted image (i.e., the group of predicted blocks of one frame) of the current frame from the movement compensator 116. Furthermore, the correction parameters used as a standard for correction based on the scene information are output to the correction data generator 123.

The correction data generator 123 determines a correction table representing the correction properties in accordance with the correction parameters, and outputs the correction table to the corrector 121. Then, the input block is subjected to pixel value conversion with reference to the correction table.

The scene change detector 124 receives the differential block from the subtractor 102, and detects scene change in the motion image based on the differential image of one frame (i.e., the group of differential blocks of one frame). Then, when a scene change is detected, scene change information representing the scene change is input to the scene determiner 122.

When the scene change information is input to the scene determiner 122, the scene determiner 122 executes scene determination of the predicted image, the correction parameters are input to the correction data generator 123, and a correction table from the correction data generator 123 is input to the compensator 121, as previously described.

That is, in the encoding unit 100, a correction method is executed for each scene change in a motion image, and correction of the motion image is executed by this correction method until the next scene change. As a result, the amount of calculation required for correction can be reduced compared to intrinsic correction of the image of each frame. Details of the processes relating to correction are described later.

As described above, the encoding unit 100 detects the movement vector of each block so as to execute variable-length encoding such as Huffman coding by determining the differential block of adjacent frames which have been movement-compensated in the same way as motion image encoding such as MPEG and the like. Then, a scene change is detected based on the differential image of one frame, and a correction method is determined in the encoding unit 100.

In general, adjacent frame in a motion image have a high degree of correlation insofar as there is no scene change, and while there is no scene change, suitable correction can be realized using the same correction method. In the encoding unit 100, the image of a frame after a scene change is analyzed in detail, a suitable correction method is derived, and this correction method is used until the next scene change so as to realize a high degree of correction with minimal calculation.

FIG. 4 is a block diagram showing the structure of the decoding unit 200 for decoding the encoded data 82, and generating the output image data 83. The decoding unit 200 has a structure similar to a normal decoding device.

A decoder 201 subjects the input encoded data 82 to variable-length decoding, and determines a quantized DCT coefficient. A reverse quantizer 202 determines the original DCT coefficient from the quantized DCT coefficient. Then, a differential block is acquired from the DCT coefficient by the reverse DCT 203.

An adder 204 inputs the differential block and the predicted block of the current frame from a movement compensator 207, which are added to generate a block of the image of the current frame.

The generated blocks are sequentially input to a combiner 205 and combined, and the image of the raster scan in block units is converted to a raster scan corrected image. Then, the generated corrected image is output as output image data 83.

On the other hand, blocks generated by the adder 204 are recorded in a frame memory 206, and used to generate a predicted block by the movement compensator 207 when generating the image of the next frame. The movement vector 84 is input to the decoding unit 200 together with the encoded data 82 as previously described, and used for movement compensation in the movement compensator 207.

Figure 5:
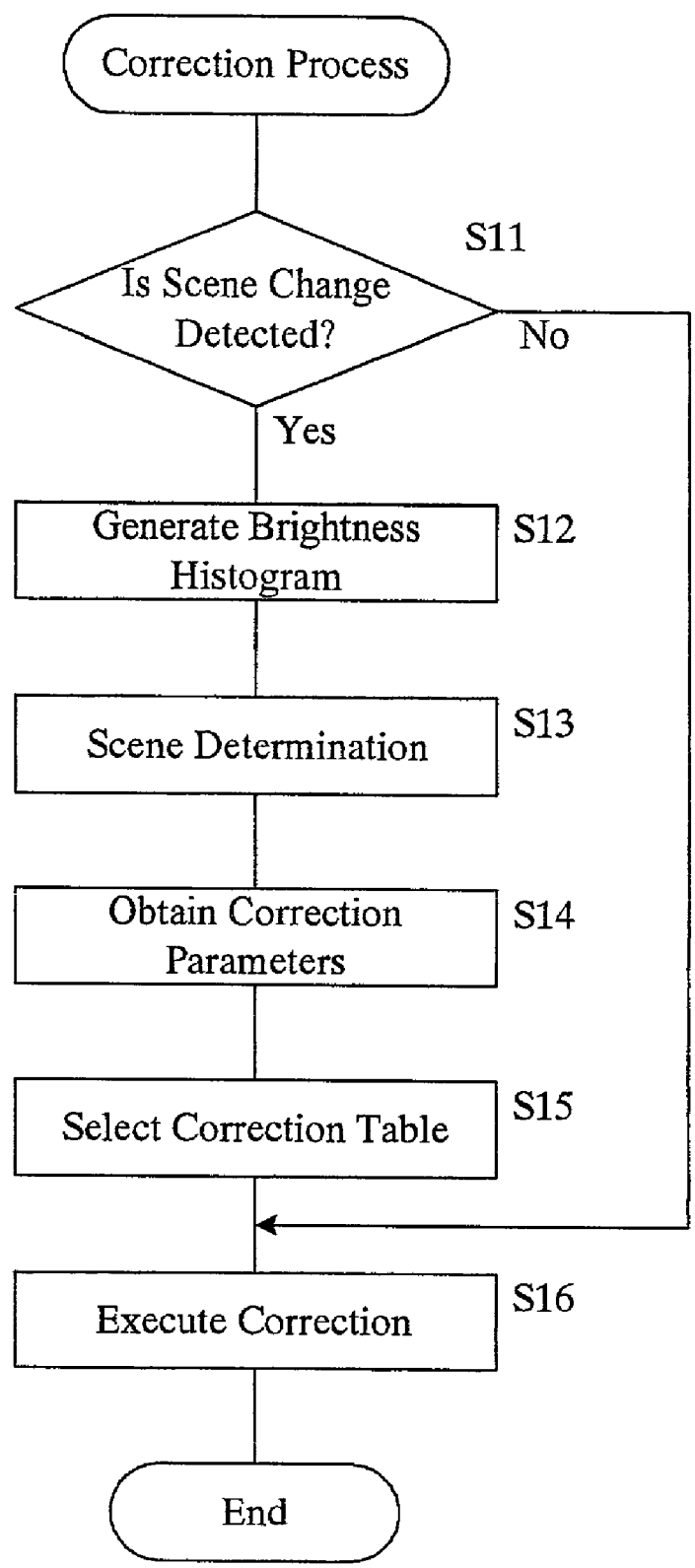
FIG. 5 illustrates the processing flow relating to correction.

The operation of the corrector 121, scene determiner 122, correction data generator 123, and scene change detector 124 in the encoding unit 100 is described in detail below. FIG. 5 is a flow chart showing the flow of the processes relating to correction in the encoding unit 100.

First, scene change is detected in the motion image by the scene change detector 124 (step S11). A scene change can be handled as a large variation of the image in a motion image. The total pixel value is determined in the differential image of one frame in the scene change detector 124. Specifically, the total pixel value is determined for the sequentially input differential blocks, and the total pixel value of the differential image of one frame is determined by sequential addition of the totals.

The total pixel value in the differential image is an index value representing the degree of difference between the previous frame image and the current frame image. When the total pixel value of the differential image exceeds a specific threshold value, a scene change has occurred, and scene change information is transmitted to the scene determiner 122.

When a scene change is detected, the scene determiner 122 determines a histogram (brightness histogram) of the pixel value of the initial predicted image (group of blocks of one frame) after scene change detection (step S12). The processing of the pixel value is accurately executed on values derived from the pixel value, but in the following description is simply described as processing of the pixel value.

Figure 6:
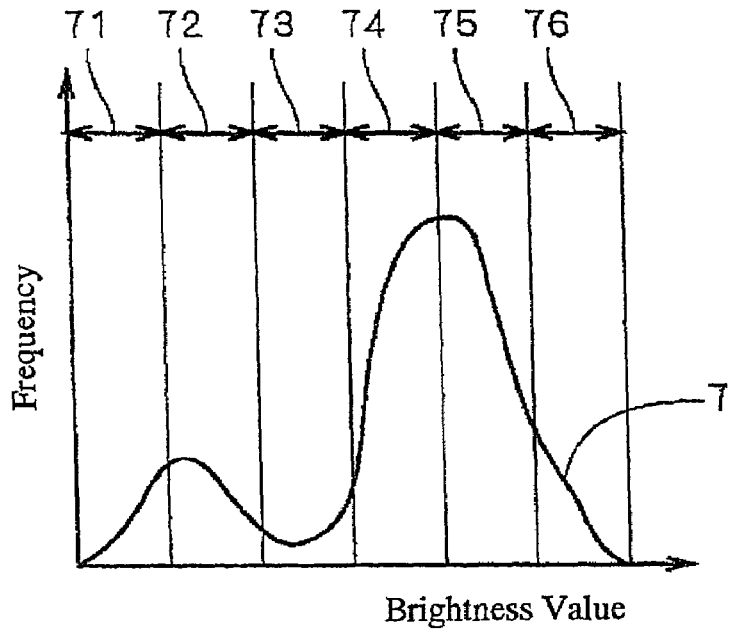
FIG. 6 shows an example of a histogram of a predicted image.

FIG. 6 shows an example of a brightness histogram 7. The brightness histogram 7 is divided into a plurality of regions as indicated by symbols 71 to 76, and detailed scene determination is executed based on the combination of total frequency and distribution of pixel values in the plurality of regions (step S13).

Scene determination is a process of determining the state of an image, specifically, a process of determining whether or not contrast is in an excessive state (high contrast), contrast is in a weak state (low contrast), backlighting state, over-bright state, under-bright state.

Figure 7:
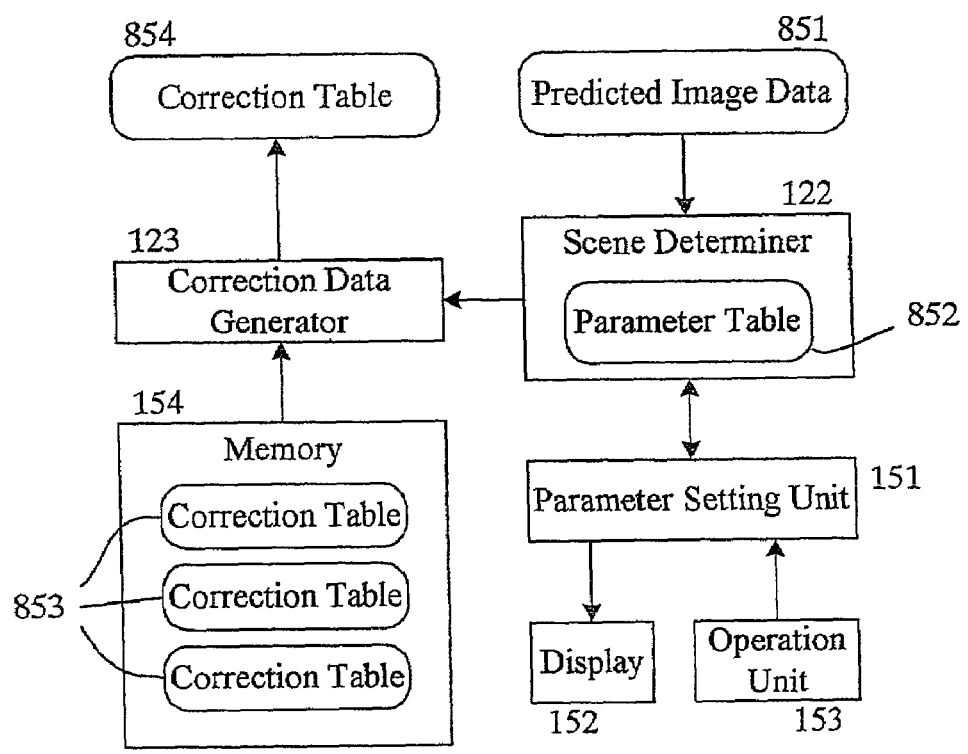
FIG. 7 is a block diagram of the scene determiner and the transfer of various types of information to the correction data generator.

When scene determination ends, the parameters necessary for correction are acquired in accordance with the scene determination result by the scene determiner 122. FIG. 7 is a block diagram showing the transfer of various types of information between the scene determiner 122 and the correction data generator 123. In the scene determiner 122, a parameter table 852 is recorded beforehand in a specific memory, and the parameter required for correction is acquired by comparing the scene determination result derived from the predicted image data 851 of the predicted image, and the parameter table 852.

The parameter table 852 is a table representing the correspondence between each type of scene determination result and parameters required for correction, as shown by example in Table 1 below. Then, the contrast correction level and brightness correction level are input as correction parameters from the scene determiner 122 to the correction data generator (step S14).

TABLE 1

| Scene Information | Contrast Correction Level | Brightness Correction Level |
| --- | --- | --- |
| Normal | 5 | 5 |
| High Contrast | 8 | 5 |
| Low Contrast | 2 | 5 |
| Backlight | 8 | 8 |
| Overexposure | 5 | 3 |
| Underexposure | 5 | 8 |

The parameter table 852 is set beforehand by the user through an operation unit 153 for receiving input from the operator, and a display unit 152 for displaying information to the operator.

Figure 8:
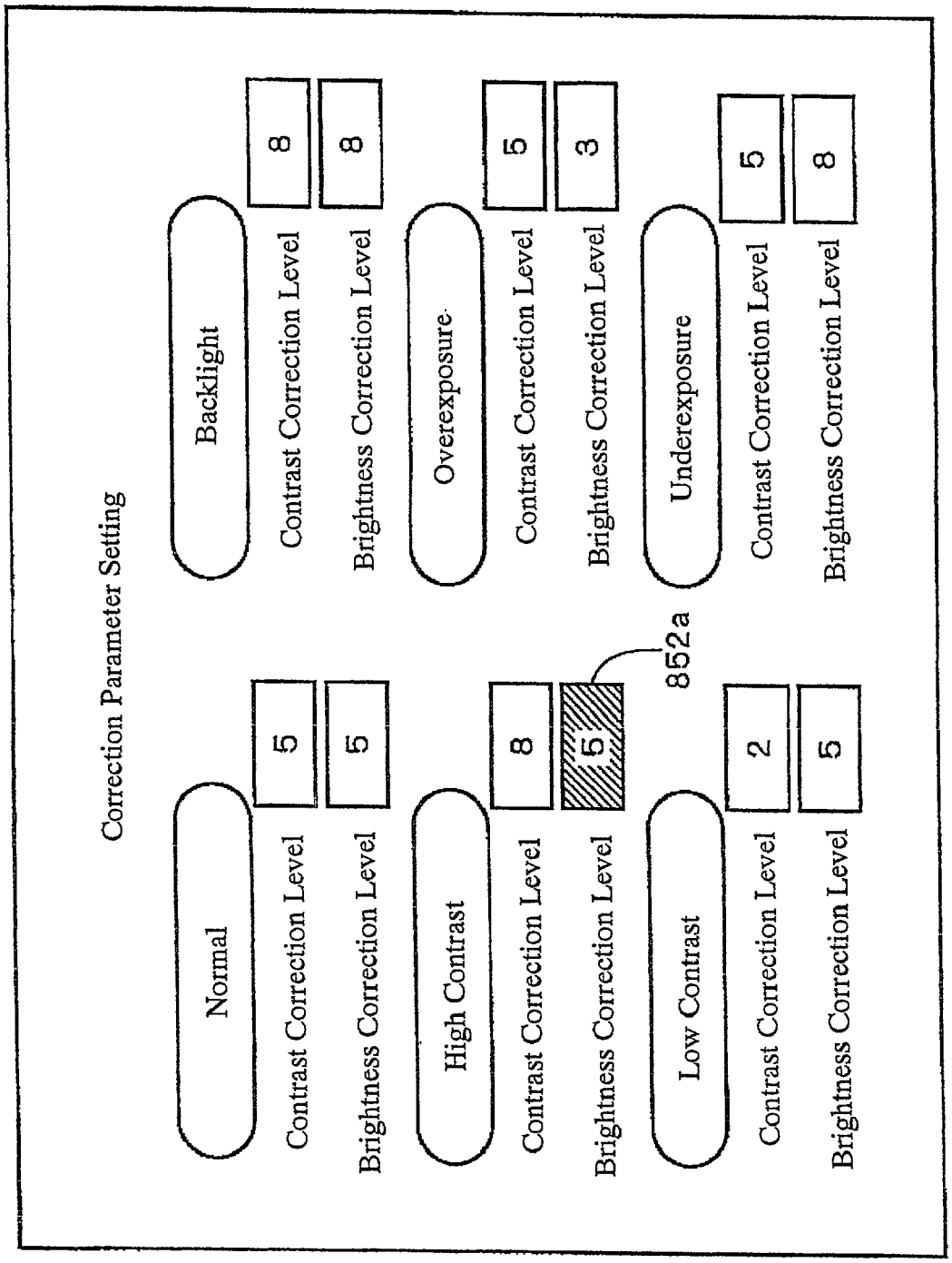
FIG. 8 shows a display screen when setting a parameter table.

FIG. 8 shows the display screen when the parameter table 852 is set. For example, the example screen of FIG. 8 is displayed on the display 152 of the display of the video camera 10; the setting object parameter is displayed highlighted as shown by symbol 852a in FIG. 8, and the content of the parameter table 852 is adjusted through the parameter setting unit 151 by operating the operation unit 153 such as an operation button or the like in accordance with the display content. In this way a user is able to set a correction method desired for the characteristics of each scene, thereby improving the quality of correction of the motion image.

In the correction data generator 123 that has acquired the correction parameter, a correction table matching the correction parameter is selected from a plurality of representative correction tables 853 stored in memory 154 beforehand, as shown in FIG. 7 (step S15). The quantity of calculation required to determine the correction table is reduced by preparing a plurality of correction tables.

Figure 9:
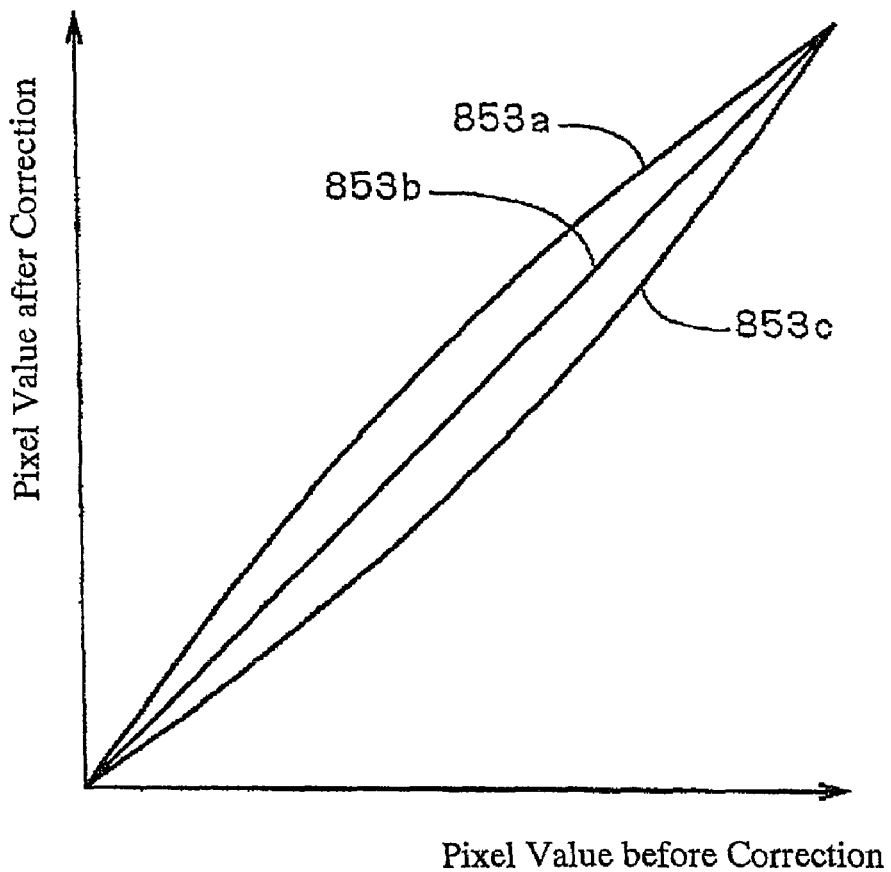
FIG. 9 shows an example of correction table characteristics.

FIG. 9 shows an example of correction table characteristics. The horizontal axis corresponds to pixel value before correction, and the vertical axis corresponds to pixel value after correction. In FIG. 9, the generally upward curve 853a represents a selected correction table when an image is brightened by correction, i.e., when the determination result is "underexposure." The straight line 853b represents the selected correction table when actual correction is not executed, i.e., when the determination result is "normal." The generally downward curve 853c represents a selected correction table when an image is darkened by correction, i.e., when the determination result is "overexposure." Although omitted from the drawing, a curve having maximum slope in the center area is selected when increasing contrast, and a curve having minimal slope in the center area is selected when decreasing contrast.

The selected correction table 854 is input to the corrector 121, and each block of an input image is subjected to pixel value conversion in accordance with the correction table in the corrector 121 (step S16).

In step S11, when a scene change is not detected, processes relating to scene discrimination and correction table selection are not executed in steps S11 through S15, and the routine advances to the correction process of step S16.

According to the above process, a correction method is set in the correction data generator 123 until a next scene change is detected in the scene change detector 124, and the corrector 121 executes correction in accordance with the correction table set in the correction data generator 123 until a next scene change is detected. That is, a motion image is corrected in accordance with the same correction method for each frame image of a scene to a continuous frame image during a scene change after a scene change has occurred. As a result, suitable correction is executed for each frame image without updating the correction method for each frame image, thereby reducing the quantity of calculation while realizing suitable motion image correction.

When encoding a motion image, correction is realized in real time by reducing the quantity of calculation.

In the encoding unit 100 shown in FIG. 3, it is unnecessary to provide a special structure for generating a differential image to detect a scene change since a differential image is used to detect scene change during encoding. That is, scene detection is realized without adding new frame memory in the encoding unit 100. Furthermore, frame memory is unnecessary for special storage of the image to be corrected since a predicted image is used rather than the image to be corrected when determining the scene. In this way an inexpensive encoding unit 100 is realized.

In the above processes, since the image (i.e., blocks of the image) input to the corrector 121 after scene change detection is a second frame, the new correction method after the scene change is applied from the second frame. Since the image of each frame is only displayed a short time when the motion image is displayed, suitable correction is executed for the entirety of the motion image even when only the first frame is suitably corrected.

When suitable correction is required from the first frame after a scene change, a frame memory may be provided specially upstream from the corrector 121. Then, a differential image of the previous frame image and the current frame image is determined before correction, and suitable correction of the first frame is realized by detecting the scene change based on the differential image. In this case, the image of a first frame after a scene change can be input to the scene determiner 122 for scene determination rather than a predicted image.

2. Second Embodiment

Although correction of a motion image is performed by the encoding unit 100 in the first embodiment, correction of a motion image also may be accomplished by the decoding unit 200.

Figure 11:
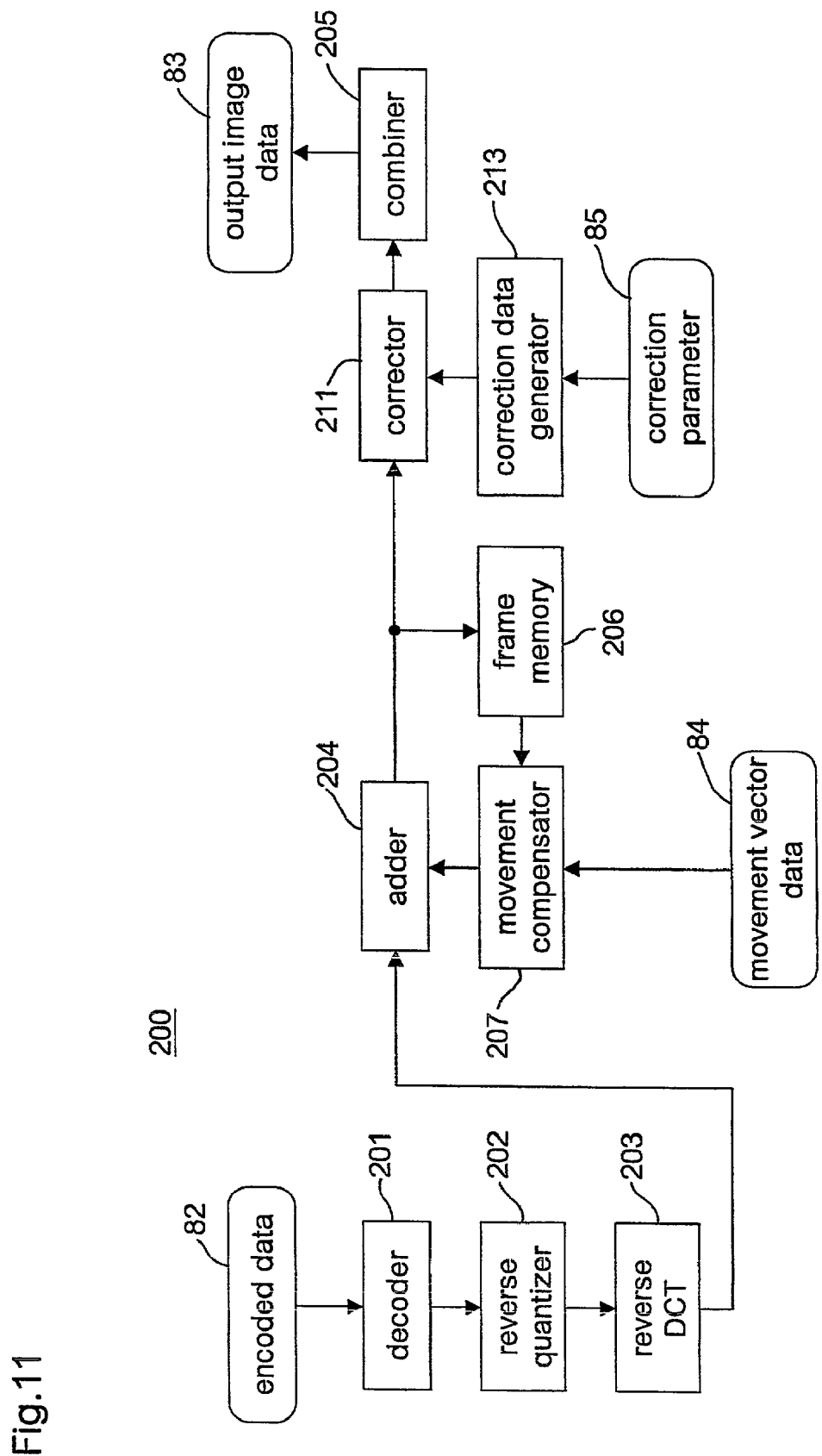
FIG. 11 is a block diagram showing the structure of a decoding unit.
Figure 12:
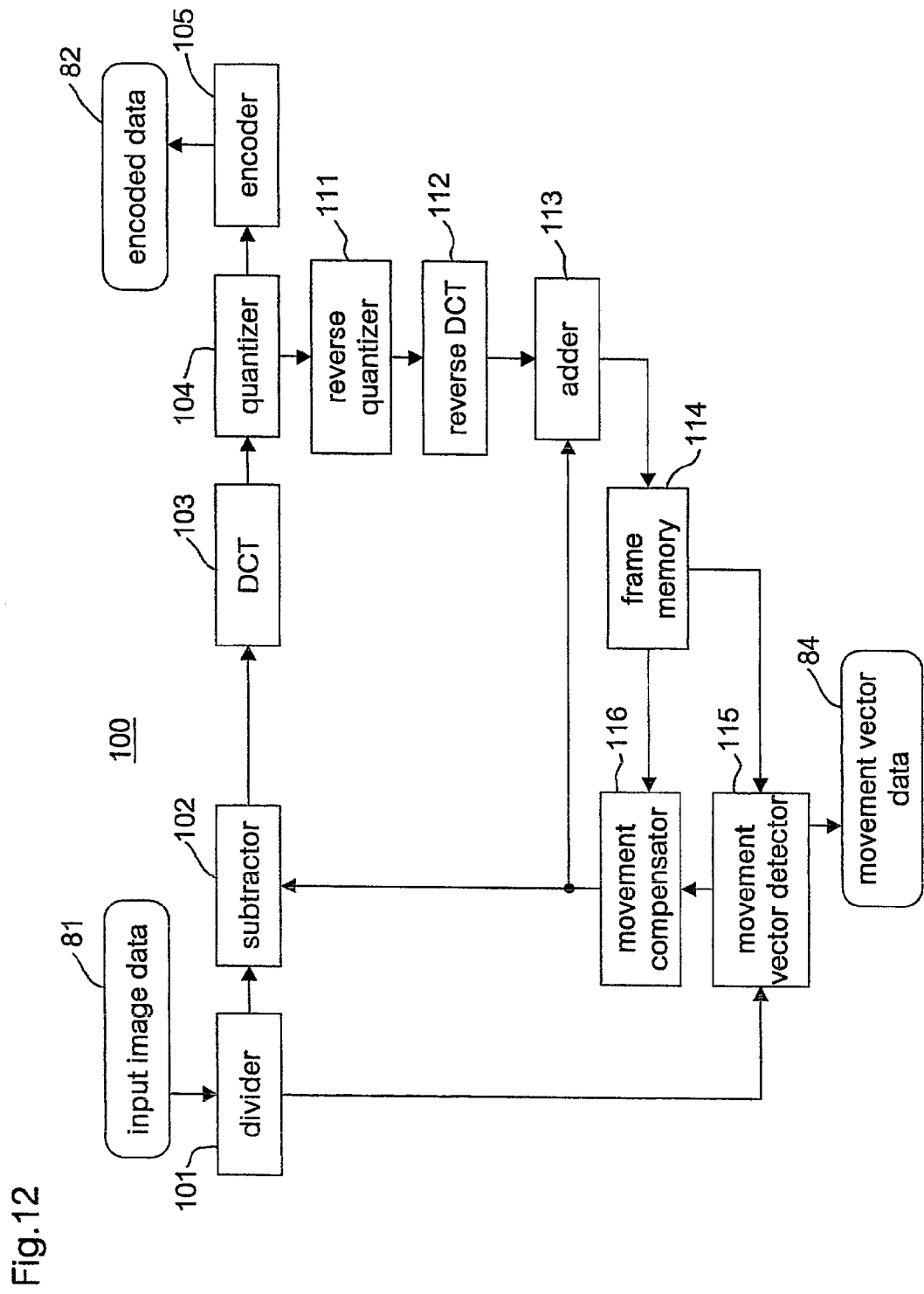
FIG. 12 is a block diagram showing the structure of an encoding unit.
Figure 15:
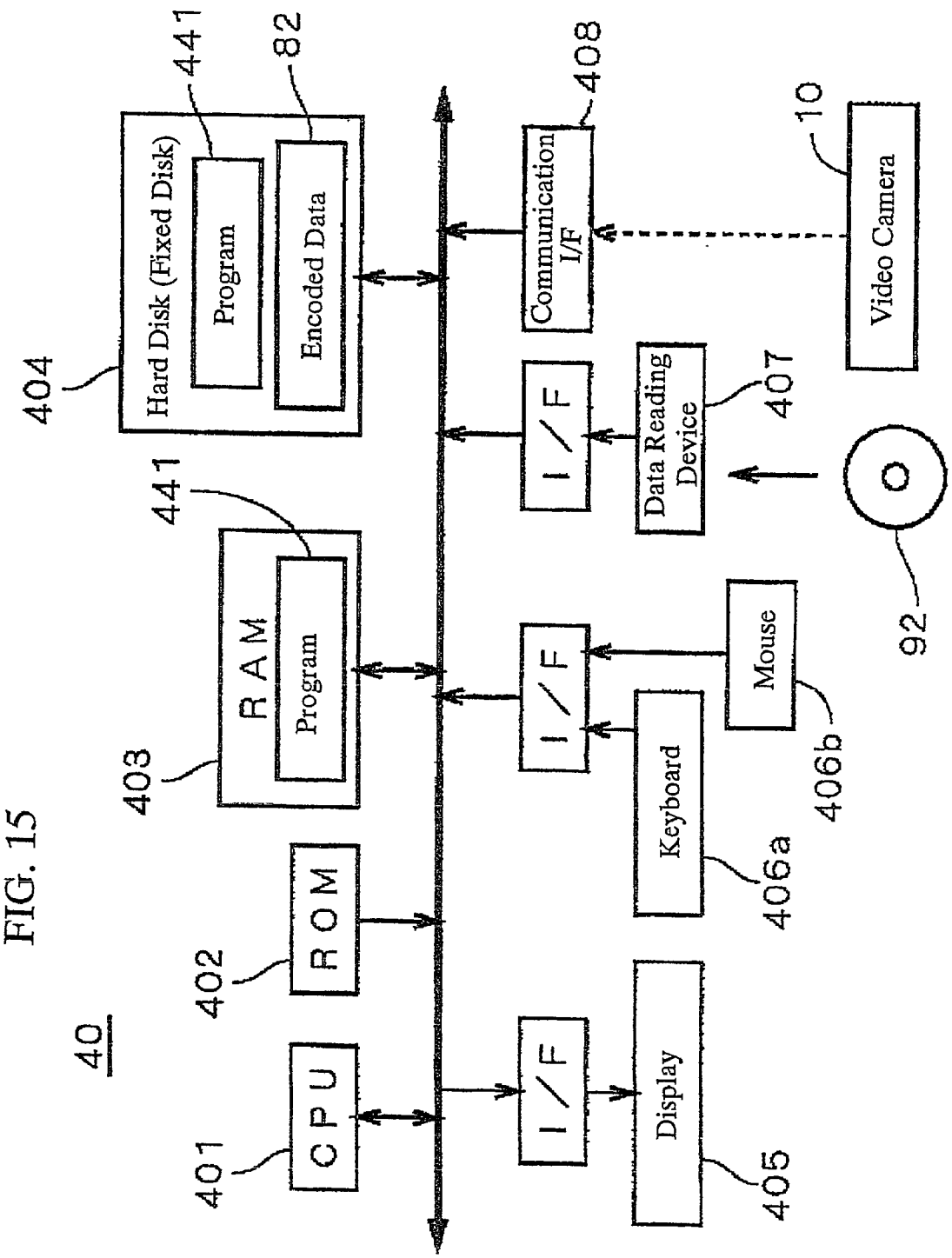
FIG. 15 is a block diagram showing the structure of a computer.

FIGS. 10 and 11 are block diagrams showing the structure of the encoding unit 100 and the decoding unit 200, respectively, of the second embodiment. The correction parameters are generated in response to a scene change in the encoding unit 100, and correction is executed in real time based on the correction parameters in the decoding unit 200.

The encoding unit 100 omits the corrector 121 and the correction data generator 123 from the encoding unit of the first embodiment, and the correction parameter 85 determined by the scene determiner 122 is transferred to the decoding unit 200 via the recording medium 91 together with the encoded data 82 and movement vector 84.

The decoding unit 200 is provided with a corrector 211 between the adder 204 and the combiner 205 of the decoding unit of the first embodiment, and a correction data generator 213 is connected to the corrector 211. The corrector 211 and the correction data generator 213 execute processing identical in structure to the processing of the first embodiment. That is, the correction parameter 85 from the encoding unit 100 is input to the correction data generator 213, and a correction table is selected in the correction data generator 213. The selected correction table is input to the corrector 211, and the corrector 211 converts the pixel values of the block generated by decoding while referring to the correction table.

The correction parameter 85 is input to match the scene change simultaneously with input of the encoding data 82, and the change of the correction method in the corrector 211 is executed in accordance with the scene change in the motion image.

As described above, the decision of correction of the motion image can be executed in the encoding unit 100, and correction can be executed in the decoding unit 200. In this case, the correction method can be changed in accordance with scene changes in the motion image, thereby reducing the quantity of calculation required for correction of the motion image.

Correction is executed in real time when decoding the motion image by reducing the quantity of calculation. As a result, the device is lower cost and more compact.

In the second embodiment, since the correction parameter 85 and encoded data 82 are transferred together to the decoder 200 and correction is executed during decoding, it is simple to select whether or not to execute correction as necessary when decoding.

Although a new correction method is applied from the image of the second frame in the first embodiment, in the second embodiment, a correction method is easily applied from the first frame after an image change by matching the input of the correction parameter 85 to the scene change.

3. Third Embodiment

The mode of the execution of all processing relating to correction in the decoding unit 200 is described below. FIGS.

12 and 13 are block diagrams respectively showing the structures of the encoding unit 100 and decoding unit 200 when executing all processes relating to correction in the decoding unit.

The encoding unit 100 omits the scene determiner 122 and the scene change detector 124 from the encoding unit of the second embodiment, and only executes encoding of the motion image.

The decoding unit 200 adds a scene determiner 212 and a scene change detector 214 to the decoding unit of the second embodiment, and executes correction of the motion image in real time together with the decoding of the encoded data 82. That is, the scene change detector 214 detects a scene change based on a differential image (i.e., group of differential blocks of one frame) output from the reverse DCT 203, and inputs the detection result to the scene determiner 212. The scene is determined by the scene determiner 212 based on a predicted image (i.e., group of predicted blocks of one frame) from the movement compensator 207, and correction parameters are determined based on the determination result and with reference to the parameter table.

Thereafter, the correction data generator 213 selects the most suitable correction table from among a plurality of correction tables using the correction parameter, and the selected correction table is used by the corrector 211 to correct the block. In this way a corrected motion image is output from the combiner 205 as output image data 83.

As described above, all processing related to correction of the motion image is executed by the decoding unit 200. In this case, the correction method can be changed in accordance with a scene change in the motion image, and the quantity of calculation required for correction of the motion image can be reduced.

Correction can be executed in real time when decoding the motion image.

In the decoding unit 200 shown in FIG. 13, the addition of a new frame memory for correction has been omitted from the decoding unit 200 by using the differential image during decoding for detection of a scene change, thereby realizing an inexpensive decoding unit.

A new correction method is used from the second frame after a scene change in the third embodiment, and presents no problem in the entirety of the motion image.

4. Fourth Embodiment

Figure 14:
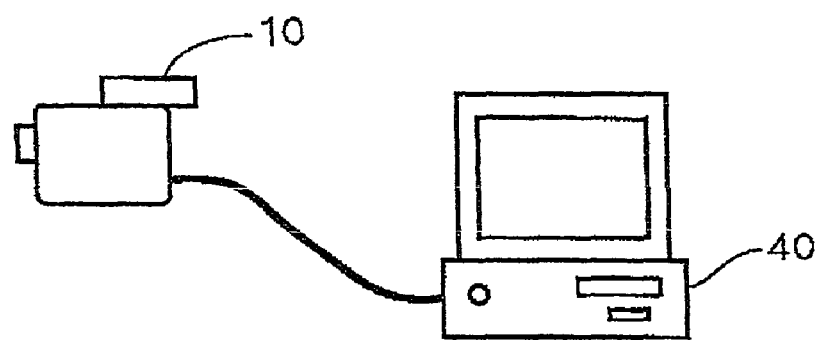
FIG. 14 shows a system wherein correction of a motion image is executed by computer.

The encoding unit 100 and the decoding unit 200 described in the first through third embodiments also may be realized in software using a computer. FIG. 14 shows a system of a video camera 10 connected to a computer 40, wherein correction of a motion image is executed by the computer 40.

The computer 40 is a typical computer system of a CPU 401 for various types of calculation processing, ROM 402 for storing a BIOS (basic input/output system) required to operate the computer, RAM 403 for storing various types of information and functioning as a work area for various programs connected by a bus line. A large-capacity fixed disk 404 for storing various types of information and an operating system and application programs, display 405 for displaying an image, keyboard 406a and mouse 406b for receiving input from an operator, reading device 407 for reading information from a recording medium 92 such as an optical disk, magnetic disk, magnetic optical disk, and a communication interface 408 for acquiring video signals from the video camera 10, are also connected to the bus line through a suitable interface (I/F).

When motion image processing is executed by the computer 40, before the fact, motion image processing programs 441 are read from the recording medium 92 via the reading device 407, and stored on fixed disk 404. Then, motion image processing is realized by copying the programs 441 to RAM 403 and executing calculation processes via computer 40 in accordance with programs 441 within RAM 403. At this time various information and the motion image are displayed as necessary on the display 405. The keyboard 406a and mouse 406b are used to set the parameter table.

When the computer 40 is used for the same function as the encoding unit 100 and the decoding unit 200 of the first embodiment, image signals from the video camera 10 are input via the communication interface 408 as digital data. Then, corrected encoded data 82 and movement vector 84 are stored on fixed disk 404 by the same structure and executing identical processing shown in FIG. 3 by the CPU 401 in the computer 40. When regenerating a motion image, the motion image is displayed on the display 405 by the same structure and executing the same process as shown in FIG. 4 by the CPU 401.

When the encoding process cannot be executed in real time due to the performance of the CPU 401, the data of the motion image may be once stored on the fixed disk 404, and thereafter encoding data 82 can be generated.

Similarly, when a computer 40 is used in the second and third embodiments, the computer 40 functions as the encoding unit 100 and the decoding unit 200 shown in FIGS. 10 through 13.

The computer 40 also may realize the operation of either the encoding unit 100 or decoding unit 200 of the first through third embodiments. For example, when the computer 40 realizes only the operation of the decoding unit 200 of the third embodiment, the video camera 10 may be used as a device for the normal encoding process, such that correction of the motion image is executed when decoding by the computer 40.

As described above, the first through third embodiments may be realized using a computer, and in this case the quantity of calculation can be reduced and processing of the motion image can be rapidly accomplished.

5. Modifications

Although embodiments of the present invention have been described above, the present invention is not limited to these embodiments and may be variously modified.

For example, processing related to the correction of the motion image is executed in the encoding unit 100 and/or the decoding unit 200 in the embodiments, however, scene change detection and motion image correction also may be accomplished unrelated to the processes of encoding and decoding the motion image.

Furthermore, although differential images are acquired from the reverse DCT 203 of the decoding unit 200 and adder 102 of the encoding unit 100 to detect scene change in the above embodiments, scene change detection also may be accomplished by other means. For example, scene change detection also may be accomplished simply from the differential image of the previous frame image and the current frame image. Furthermore, scene change also may be detected from the movement vector and a histogram of the pixel value of the differential image.

Information representing the timing of a scene change also may be prepared separately from the motion image. That is, a scene change need not necessarily be detected from the motion image insofar as information representing a scene change may be specially input.

In the above embodiments a scene change is detected as a large change in the motion image, and in this case the detected scene change does not necessarily match a physical scene change of the motion image when photographed. The change of a motion image of largely a single scene may be detected as a scene change. In this way the scene change in the above descriptions need not match a change in the physical scene, and suitable correction of the motion image and reduction of the quantity of calculation can be reduced by detecting a change in the motion image equivalent to a scene change as a scene change.

In the above embodiments, correction is executed for the image of each frame, however, correction may be executed for the differential image. In this case the correction table of the differential image is used. Then, when correcting the differential image, the correction of the motion image can be executed after the subtractor 102 of the encoding unit 100 and after the reverse DCT 203 of the decoding unit 200. In this way correction of the motion image can be accomplished in optional stages based on a scene change.

The above embodiments have been described in terms of inputting the encoded data 82 from a video camera 10 to a regenerating device 20 via a magnetic tape, however, other methods may be used as the data transfer method. For example, an IC memory or recording disk may be used as a transfer recording medium, wireless communication or wired communication through a transmission cable or computer network may be used. Various means may be used similar to the data transfer between video camera 10 and computer 40 in the fourth embodiment.

In the first through third embodiments, the encoding unit 100 is provided in a video camera 10, and the decoding unit 10 is provided in a regenerating device 20, however, both units may be provided in the video camera 10, or in the regeneration device 20. That is, the video camera 10 and the regeneration device 20 in the above description are only specific examples, and the encoding unit 100 and the decoding unit 200 may have various types of structures.

The embodiments above have been described in terms of image data input from a video camera 10 to a regeneration device 20 or computer 40, however, other image output devices may be used such as a video deck in place of the video camera 10.

In the above embodiments, a prediction block of the current frame is determined by movement compensation, and the quantity of calculation is reduced by preventing detection of movement of the main object in the same scene, and reducing the frequency of detecting a scene change. However, the movement compensation structure may be omitted except when using slight movement such as fixed point observation (e.g., monitoring through a monitor camera). In this case the image of the previous frame may be used as the predicted image. The predicted image is not limited to the image of the previous frame or image after movement compensation, inasmuch as an image derived from an image prior to the previous frame may be used as the predicted image of the current frame.

Correction in the above embodiments is not limited to correction of brightness level, insofar as such correction may pertain to hue, chroma, color saturation and other image features, or correction of a plurality of image features.

The image of each frame is divided into blocks in the above embodiment, however, correction, encoding, decoding and other processing may be performed without dividing the image into blocks. Conversely, although all blocks of one frame are used in the same correction in the above embodiments, each block also may be corrected using a different correction table. In this case a correction table corresponding to each block is used in the corrector, and these correction tables are updated when a scene change is detected.

In the above embodiments, the necessity of processing in the correction data generator and the like is determined in accordance with the presence or absence of detection in the scene change detector, and the processing time changes. Accordingly, the rate of data input to the corrector also may change in accordance with the presence or absence of detection of a scene change to provided more rapid processing. For example, a scene change detection result from the scene change detector 124 is input to the divider 101 as indicated by the dashed line in FIG. 3, and while a scene change is not detected the data transfer rate may be increased, and when a scene change is detected, the data transfer rate may be decreased.

A plurality of representative correction tables are prepared beforehand as correction methods in the above embodiments, however, the correction table may be generated when a scene change is detected. For example, a correction table may be generated from a cumulative histogram of pixel values in the predicted image or decoded image. That is, frequency values in the cumulative histogram may be standardized, and a correction table generated by clipping values above a set value, adding a fixed value, correcting black/white end areas and the like.

In the fourth embodiment, the encoding unit 10 and/or the decoding unit 200 are realized using a computer 40, however, part of the encoding unit 100 and/or part of the decoding unit 200 also may be realized using a computer 40. Various structures in the first through third embodiments need not be hardware, and may be realized by suitably using logic circuits and microcomputers. For example, processing in the correction data generator may be realized by microcomputer, and other structures may be realized by logic circuit. The encoding unit 100 and the decoding unit 200 also may be realized by a plurality of computers.

The structures relating to correction described in the first through third embodiments can be provided by optionally dividing them between the encoding unit 100 and the decoding unit 200. For example, only the scene determiner 122 may be provided in the encoding unit 100, and other structures related to correction may be provided in the decoding unit 200.

Obviously, many modifications and variation of the present invention are possible in light of the above teachings. It is therefore to be understood that within the scope of the appended claims, the invention may be practiced other than as specifically described.

What is claimed is:

1. A motion image processor, comprising:
   a scene determiner for selecting correction parameter values based on a state of an image;
   a corrector for correcting image data of the motion image based on the correction parameter values acquired by the scene determiner; and
   an acquiring portion for acquiring scene change information indicating a scene change in the motion image;
   wherein, when the scene change information indicates a scene change, the scene determiner selects new correction parameter values for the motion image, wherein the selected correction parameter values are maintained for each frame image until a next scene change information is acquired.

2. The motion image processor as claimed in claim 1, further comprising a corrector for correcting the motion image in accordance with the correction parameter values until the next scene change information is acquired.

3. The motion image processor as claimed in claim 1, further comprising a storage for storing the plurality of correction parameter values beforehand.

4. The motion image processor as claimed in claim 1, wherein the acquiring portion generates the scene change information based on a differential image of an image of a current frame and a predicted image of the current frame predicted from an image of a previous frame from the current frame.

5. The motion image processor as claimed in claim 4, wherein the determining portion determines a correction process based on the predicted image.

6. The motion image processor as claimed in claim 1, further comprising a corrector for correcting the motion image in accordance with the correction parameter values until the next scene change information is acquired, and wherein the corrector executes correction of the motion image in real time.

7. The motion image processor of claim 1, wherein the correction parameter values are used to correct the motion image in terms of at least one of tone, hue, chroma, brightness and contrast.

8. A motion image processor, comprising:
an acquiring portion for acquiring scene change information indicating a scene change in a motion image;
a determining portion for selecting from among a plurality of correction parameters a set of correction parameter values for each frame image of the motion image until next scene change information is acquired; and
a corrector for correcting each frame image of the motion image based on a same selected set of correction parameter values until the next scene change information is acquired.

9. The motion image processor as claimed in claim 8, wherein the corrector executes correction of the motion image in real time.

10. The motion image processor of claim 8, wherein the correction parameter values are used to correct the motion image in terms of at least one of tone, hue, chroma, brightness and contrast.

11. A motion image processing method comprising following steps of:
acquiring scene change information indicating a scene change in a motion image;
acquiring a set of correction parameters from among a plurality of correction parameters sets, for correcting each frame image of a motion image until the next scene change information is acquired; and
correcting each frame image of the motion image in accordance with a same selected set of correction parameter values until the next scene change information is acquired.

12. The motion image processing method of claim 11, wherein the correction parameter values are used to correct the motion image in terms of at least one of tone, hue, chroma, brightness and contrast.

13. A computer-readable recording medium encoded with a computer program executed by a computer for correcting a motion image, the computer program comprising following steps of:
acquiring the scene change information indicating a scene change in the motion image;
acquiring a set of correction parameters from among a plurality of correction parameter sets, for correcting each frame image of the motion image until the next scene change information is acquired; and
correcting each frame image of the motion image in accordance with a same selected set of correction parameter values until the next scene change information is acquired.

14. The computer-readable recording medium of claim 13, wherein the correction parameter values are used to correct the motion image in terms of at least one of tone, hue, chroma, brightness and contrast.

15. An image sensing apparatus comprising:
an image sensing unit for acquiring a motion image;
a detector for detecting scene change information indicating a scene change in the motion image acquired by the image sensing unit;
a determiner for selecting from among a plurality of motion image correction parameters, a set of motion image correction parameter values to be applied unchanged to each frame image of the current scene when the scene change information is detected;
an image corrector for correcting images in the current scene of the motion image in accordance with the determined image correction parameter values; and
a recording device for recording the motion image corrected on a recording medium.

16. The image sensing apparatus of claim 15, wherein the correction parameter values are used for correcting the motion image in terms of at least one of tone, hue, chroma, brightness and contrast.

17. A motion image processor, comprising:
an acquiring portion for acquiring scene change information indicating a scene change in a motion image; and
a determining portion for determining, when the scene change information is acquired, a set of correction parameter values for the motion image to be unchanged until next scene change information is acquired,
wherein the acquiring portion generates the scene change information based on a differential image of an image of a current frame and a predicted image of the current frame predicted from an image of a previous frame from the current frame.

18. The motion image processor as claimed in claim 17, wherein the determining portion determines a correction parameter value based on the predicted image.

19. The motion image processor of claim 17, wherein the correction parameter values are used for correcting the motion image in terms of at least one of tone, hue, chroma, brightness and contrast.

* * * * *